United States Patent [19]
Harrison

[11] 3,899,325

[45] Aug. 12, 1975

[54] METHOD OF MAKING A CLOSED END TUBE

[75] Inventor: Brian G. Harrison, Drexel Hills, Pa.

[73] Assignee: Minnesota Mining and Manufacturing Company, St. Paul, Minn.

[22] Filed: July 14, 1969

[21] Appl. No.: 841,260

[52] U.S. Cl.................... 75/208 R; 75/211; 75/214
[51] Int. Cl............ B22f 1/00; B22f 3/00; B22f 3/20
[58] Field of Search............. 75/208, 214; 29/182.2, 29/182.5

[56] References Cited
UNITED STATES PATENTS

| | | | |
|---|---|---|---|
| 2,265,352 | 12/1941 | Corbin et al. | 313/136 |
| 2,652,520 | 9/1953 | Studders | 75/208 |
| 2,819,163 | 1/1958 | Balke et al. | 75/214 |
| 2,957,235 | 10/1960 | Steinberg | 75/208 |
| 3,010,196 | 11/1961 | Smith et al. | 75/208 |
| 3,367,752 | 2/1968 | Johnson | 75/208 |

FOREIGN PATENTS OR APPLICATIONS

| | | | |
|---|---|---|---|
| 611,944 | 1/1961 | Canada | 75/208 |

*Primary Examiner*—Benjamin R. Padgett
*Assistant Examiner*—B. Hunt
*Attorney, Agent, or Firm*—Alexander, Sell, Steldt and DeLaHunt

[57] ABSTRACT

A metallurgically integral tube of shaped sintered powdered metal having at least one end closed. A green structure of the tube is formed by first extruding a clay-like mixture of powdered metal and a heat fugitive binder into the shape of a tube, then extruding from said mixture a rod-like plug and inserting the plug into the end of the tube. The closed-end green structure can also be made by causing the tubular extrusion output to converge against a plate, thereby closing the end of the tube. The shaped green structure is then sintered in a reducing atmosphere to produce the closed end, integral tube.

2 Claims, 5 Drawing Figures

PATENTED AUG 12 1975

3,899,325

INVENTOR
BRIAN G. HARRISON
BY Kinney, Alexander
Sell, Steldt & DeLaHunt
ATTORNEYS

METHOD OF MAKING A CLOSED END TUBE

This invention relates to tubular articles made from sintered powdered metal and having at least one end closed, and to a process for making such articles.

Tubular articles and constructions such as tubular filters and heat exchangers made from sintered powdered metal, using powder metallurgy techniques, have been disclosed in the art. Heretofore if the end or ends of these tubular articles were required to be closed, techniques of welding, brazing, soldering, crimping or the like have been employed. For example, it is common practice when manufacturing a tubular product to weld a plug in the end of the tube to effect a seal. As another example, if the inside diameter of the tube is small, a seal can be accomplished by welding the end shut. These prior art techniques are often found inadequate because they generally tend to produce structurally inferior seals or closed ends.

Welding of porous structures is much more difficult than welding conventional wrought or completely dense metals because of the severe contraction of the porous metal during fusion. Likewise, brazing porous metals, besides producing a mechanically weaker joint than a welded joint, has severe limitations because the brazing metal, being of lower melting point than the porous structure metal, tends to flow into the pores of the porous stock and reduce the desired porosity of the article.

Closing the ends of tubes by mechanical means, such as crimping for example, is limited to non-brittle metals; therefore, mechanical sealing of the ends of tubes made of metals such as tungsten, porous stainless steel and the like cannot be easily accomplished due to the brittle nature of the metal.

The tube of this invention has at least one end closed and is entirely made of sintered powdered metal to form a metallurgically integral rigid structure which lacks inadequacies of the prior art sealed tubes. The tube is characterized by a homogeneous metal grain size throughout the entire structure including the area of the end seal. This homogeneity of composition and grain size provides a closed tube which is structurally superior to that of a tube with a welded closure, is more resistant to fatigue, and has an aesthetic appearance. The preferred end of the tube is transverse planar with respect to the tubular structure.

Tubular green structure of powdered metal and a heat fugitive binder, such as those of extruded configurations, are provided with a closed end by means of this invention, and when the tubular green structure is sintered it becomes metallurgically integral and comprises a homogeneous structure of sintered shaped powdered metal. The term "metallurgically integral" as used herein means that the contiguous surfaces of the assembled tube and plug are bonded together by interatomic diffusion as are the particles of each of these components, as a result of the sintering of the assembly, the sintered tube thus in effect being one piece of metal.

The closed end structure of this invention, in a preferred embodiment, is extruded to the length desired in the form of a tubular output from a plastic or clay-like mass comprising a powdered metal and a heat fugitive binder. This tubular output or extrudate can have a variety of internal or external longitudinally disposed undulations depending upon the user's requirements. For example, a finned heat exchanger having multiplicity of longitudinally disposed corrugations can be formed by extruding the plastic mass through an appropriate die. The end of this tubular output can be closed by a pivotal closure plate against which the output of the extruder abuts, which causes the tubular output to converge to a solid rod-like output thereby providing a closed end green structure. The green structure can also be made by first extruding the tubular structure and then extruding a solid structure in the form of a plug of the clay-like material, which has a cross-sectional configuration similar to that cross-sectional configuration of the inner opening of the tubular structure. The closed end green structure is assembled by inserting the plug or solid green structure into the tubular green structure. The contiguous surfaces of each of the components, prior to assembly, are softened (by wetting with a solvent for the heat fugitive binder for example) and thereafter these surfaces are brought into intimate contact by peripherally applied pressure or by isopressing the assembled green structure. The resultant closed-end green structure is then sintered in a reducing atmosphere to give a metallurgically integral tube.

The isopressing is accomplished by first providing sufficient internal support to the tubular part of the assembled green structure to prevent collapse. This can be done by inserting a metal mandrel, such as a steel rod, into the tubular cavity of the green structure. This assembly is then sealed into an oil impervious pouch, a plastic or rubber tube for example, and submersed in an oil-filled pressurizable cylinder. The cylinder is then pressurized until sufficient pressure is exerted on the green structure to cause the component parts to come into intimate contact with each other. Pressures of 500 to 40,000 psi have been found to be adequate. Simultaneous compaction of plug and tube occurs. This compaction is important because it tends to increase the density of the green structure, precisely size the inner diameter, and reduce the shrinkage during the subsequent sintering. It has been found useful to isopress the component parts separately or to isopress only the plug and not the tube or only the tube and not the plug, depending on the particular effects sought in the finished structure. Isopressing has also been found to be an effective way to eliminate internal stresses as well as to insure complete circumferential bonding of the component parts.

Isopressing the tubular structures or the component parts has been found to be effective after the tubular structure or components have been prefired. Prefiring is accomplished by heating to a temperature which removes most of the organic heat fugitive binder by burning it off but effects little sintering of the metal particles. After prefiring, the tubular structure has structural integrity sufficient to maintain its shape. Isopressing the structure after the prefiring provides a structure which undergoes considerably less shrinkage during sintering, therefore the dimensions of structures can be more easily controlled when prefiring and isopressing are done prior to sintering.

For a full understanding of the nature and objects of the present invention, reference should be had to the following detailed description, taken in connection with the accompanying drawing wherein.

Figure 1:
FIG. 1 is a longitudinal cross-sectional view of a tubular structure and a plug for closing one end before assembly of these parts.

Referring now to the accompanying drawing and initially to FIG. 1 which shows a tubular construction 1 having been formed by extruding a plastic mixture of a powdered metal and a heat fugitive binder. Likewise, a solid structure or plug 2 is shown. This plug 2 is shaped or extruded so as to have an outer diameter essentially equal to or slightly smaller than the inner diameter of the tubular construction 1, or if the cross-sectional configuration of the opening of the tubular construction is non-circular, the cross-sectional configuration of the plug is prepared so that it is essentially the same as that of the opening.

Figure 2:
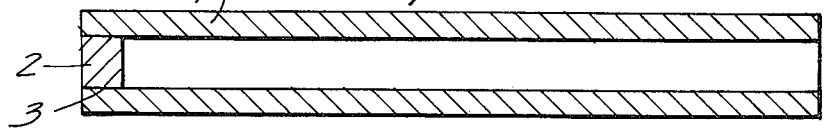
FIG. 2 is a similar cross-sectional view showing the component parts as assembled.
Figure 3:
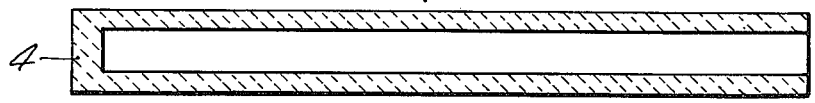
FIG. 3 is a similar cross-sectional view showing the closed end structure as sintered.

FIG. 2 shows an assembled green structure of a closed end tube having a tubular construction or structure 1 with a plug 2 inserted into one end. Prior to assemblying the dried green components, the surfaces 3 that will be in intimate contact are softened by wetting with a solvent of the heat fugitive binder. The components are assembled and isopressed as hereinbefore described to cause the parts to come into intimate contact.

The plug 2 and the tubular structure 1 can be of the same composition or the compositions may be different according to the needs of the user. For example, the tubular structure 1 can be made non-porous and the plug 2 made porous, or the structure can be made so that the plug and the tube are both porous but with differing degrees of porosity.

The other end of the tube can be plugged or closed in a similar manner if desired; however, a small opening should be made somewhere in the structure of non-porous articles to provide a means for gases to escape during the subsequent processing steps.

Figure 4:
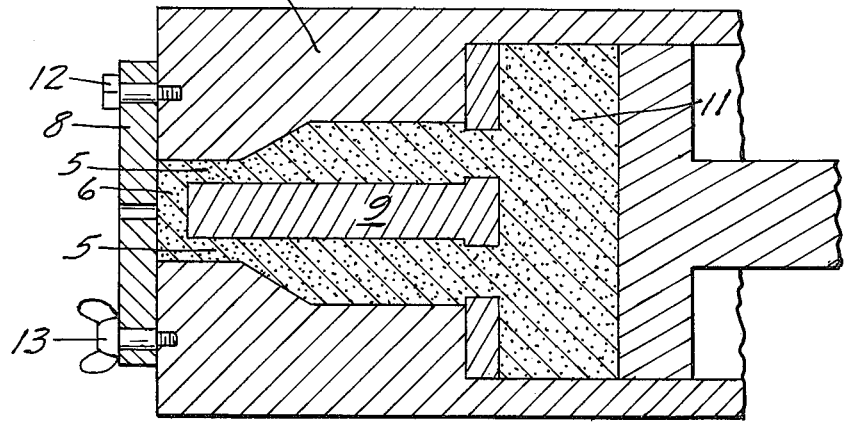
FIG. 4 is a cross-sectional view of a simplified version of an extruder showing the accomplishment of the end closure by causing the tubular extrusion output or extrudate to abut a pivotal plate and thereby converge to a solid shape.

FIG. 4 shows another way of accomplishing a structure with a closed end. A plastic mixture 11 of a heat fugitive binder and a powdered metal is extruded from a conventional extruder 10 such as a Loomis 120 ton extrusion press which is adapted by means of mandrel 9 to produce tubular extrudate 5. Pivotal plate 8 which pivots on pin 12 is a modification of the extruder 10 which when clamped in place on the die by means of holding pin 13 causes the tubular extrudate 5 to abut the plate 8 and to converge to form the closed end 6. Hole 7 is provided in the pivotal plate 8 so that air can escape from the decreasing airspace created by the advancing extrudate.

Figure 5:
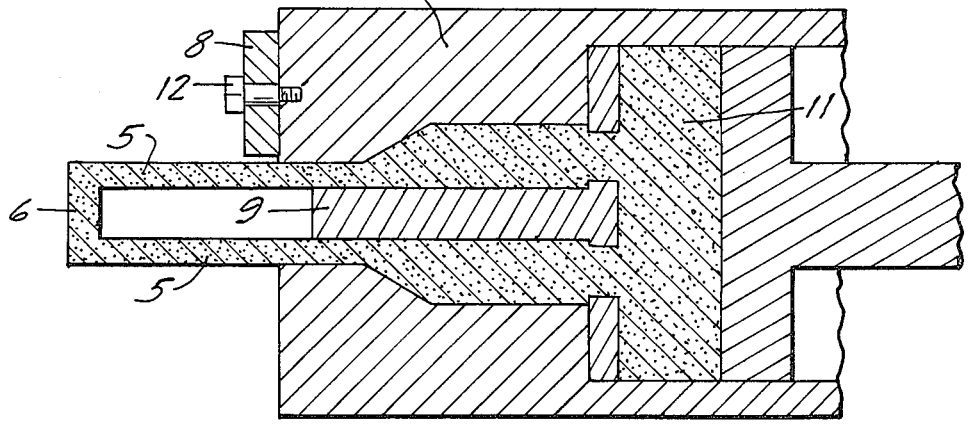
FIG. 5 is a cross-sectional view of a simplified version of an extruder showing tubular extrusion after the end closure has been accomplished.

Once the end closure has been accomplished by the method shown in FIG. 4, pivotal plate 8 is moved so that it no longer interferes with the tubular output or extrudate 5 and the extrusion is continued as shown in FIG. 5 until the tubular extrudate 5 reaches the length desired; thereupon, the structure is cut from the extruder, allowed to dry, and then sintered according to process hereinafter described.

As mentioned hereinbefore, the closed end tube of this invention is made from known powdered metals using conventional powder metallurgy techniques. An excellent description of this metallurgical process is found in "Review of the Powder Metallurgy Process," July, 1966, published by the U.S. Army Production Equipment Agency, Manufacturing Technology Division, Rock Island Arsenal, Illinois. Also see U.S. Pat. No. 3,367,752.

The preferred powdered metals used in this invention are those of austenitic chromium-nickel stainless steel, these alloys generally containing 16.0 to 26.0 weight percent chromium, 6.0 to 22.0 weight percent nickel, 0.03 to 0.25 weight percent carbon, and occasionally some other elements added to develop certain specific properties, such as 1.75 to 4.00 weight percent molybdenum or small amounts of titanium, tantalum, and niobium to minimize formation of chromium carbides. Standard types of these steels have been assigned numbers and specifications by the American Iron and Steel Institute. These are generally known in the art as stainless steels of the AISI 300 series, types 301, 302, 304 and 305 generally referred to as "18-8" stainless steel, and the "workhorse" type 316 generally referred to as "18-8 Mo." All of these AISI stainless steels of the 300 series are applicable in the practice of this invention. Of course, other powdered metals can be used in fabricating the tubes of this invention, such as iron, molybdenum nickel, tungsten, copper, cobalt, and the like, and alloys of such metals, including bronze, monel, etc.

Tubes of this invention can be prepared using dispersion hardening technology wherein dispersion hardened compositions are prepared by dispersing small amounts of certain refractory materials in some metals to provide a composition which, after sintering, have increased structural strength. For example, two weight percent $ThO_2$ in nickel or tungsten will provide a tube which after sintering has increased structural strength.

Porous tubes having sealed ends (or non-porous tubes with porous ends) are made from powdered metal which is relatively coarse in order, upon sintering the resulting shaped article, to obtain the desired permeability or micronic rating. For purposes of making the porous parts, mesh sizes in the range of −20+325 can be used, such as −200+325, −100+200, −50+100, and −20+50, or blends thereof, suitably selected to produce the desired micronic rating or bubble point, and to that end small amounts, e.g. 1–20 weight percent, of −325 mesh can be blended with the coarse powder, e.g., with the −50+325 mesh. (The term "mesh" referred to herein means mesh size according to U.S. Standard Sieve.) The use of powdered metal with these mesh ranges will enable one to make porous tubular structures in accordance with this invention with various micronic ratings, e.g., in the range of 1 to 150 microns.

In fabricating of these structures, the powdered metal of desired mesh is blended with an organic heat-fugitive binder, such as those disclosed in U.S. Pat. Nos. 2,593,943; 2,709,651; and 2,902,363; the preferred binder is methyl cellulose. Various solvents can be used in conjunction with these binders, such as water, as well as various plasticizers, such as glycerin. The blending can be carried out in a conventional manner in various types of commercially available mixers, blenders, tumblers, and the like, care being taken to insure that the blend is homogeneous and the components well dispersed. The resulting blend will be in the nature of a plastic mass or dough and will be similar in consistency to that of modeling clay. The plastic mass can be extruded to the desired shape and then dried to form a green structure. The green structures can be extruded to size, taking into account the 1–25 percent linear shrinkage which will occur upon sintering and compensating for it by making the shapes with oversize dimensions.

The green components forming the parts of the tubular structure are assembled in the proper contiguous relation. In assembling the components, they can be wetted with the aforementioned binder solvents, (or 1–3 percent solution of binder in solvent), the binder in the shaped components being reactivated by the wetting solvent to help consolidate the assembled components. The components are then isopressed as hereinbefore described. This integral green structure is then sintered under vacuum or a suitable atmosphere, such as a reducing atmosphere like hydrogen or dissociated ammonia. Sintering can be accomplished in a furnace heated to the proper temperature or by resistive heating wherein electrodes are attached to either end of the green structure or preferably a prefired structure and sufficient electric current is passed through the tube causing it to heat to the proper temperature. Sintering atmosphere, temperature, and duration of sintering will depend upon the particular powdered metals used, the selection of these conditions being within the skill of the art. In the case of the austenitic stainless steels mentioned above, a hydrogen or dissociated ammonia atmosphere with a dew point of −40°F. or lower and sintering temperatures in the range of 1200° to 1400°C., preferably 1250° to 1350°C., will be suitable, and the duration of sintering will usually be from 10 minutes to 2 to 3 hours.

As is evident from the above, the sintered tubular structure of this invention is made entirely of powdered metals without requiring or employing wrought metal components. The closed-end tubular structure is constructed without welding and is, therefore, free of disadvantages associated with welding or brazing. An important advantage or feature of the closed-end tubular structure of this invention is the integral metallurgical or sinter bond between the various parts, this feature enables the end seal to withstand stresses and other forces normally encountered during operation without being prone to the deformation, rupture, or other types of failure experienced with prior art end seals which do not have the metallurgically integral supported features of this invention. Higher operating pressures can be used without fear that the end seal will rupture or leak and result in loss of effective use.

EXAMPLES

The object and advantages of this invention are further illustrated by the following examples, but particular materials and amounts thereof recited in these examples, as well as other conditions and details, should not be construed to unduly limit this invention.

EXAMPLE 1

A dense, gas impermeable, metallurgically integral, finned, nickel, closed end tube, usable as a heat exchanger, was prepared by mixing 9500 grams of nickel powder (INCO Carbonyl Grade T-100) and 500 grams of 4000 cps. methyl cellulose (Methocel 60 HG), dry blending, and then adding 500 cc of a 20 volume percent solution of glycerin in water and 200 cc of water, and thereupon blending this mixture to a clay-like consistency for one hour in a Braeblender sigma blade mixer. The clay-like material was then charged into a Loomis 120 ton extrusion press, fitted with an extrusion die capable of forming a finned tube. A finned tube 12 inches in length and having a 0.314 inch inner diameter was extruded and allowed to dry. The extrusion die was replaced with a die capable of producing a rod and sufficient rod-like material was extruded to produce a one inch long plug having a 0.327 inch outer diameter. After drying, the curved cylindrical surface of the plug was machined so that it would fit the hole of the extruded tube. The surface of the plug was wet with water to partially dissolve the methyl cellulose binder exposed at the surface. The plug was inserted into the end of the finned tube, whose inner surface contacting the plug had been previously wetted. The assembly was dried overnight at room temperature.

The assembled structure having inserted a 19/64 inch outer diameter drill rod mandrel into the tubular cavity, was isopressed in a flexible rubber envelope submersed in oil in a pressurizable cylinder which was pressurized to 35,000 psi. The dried green assembly was removed from the pressing device and placed on an inert sagger and heated slowly to 1300°C. in a hydrogen atmosphere and held at 1300°C. for 2 hours.

EXAMPLE 2

A closed end, porous stainless steel filter tube was produced by mixing as hereinabove described in Example 1, 3000 grams of −100+200 mesh 316L stainless steel powder (Alchor 316L), 150 grams of methyl cellulose and 600 cc of 10 volume percent solution of glycerin in water, thereupon blending this mixture to a clay-like consistency. A first quantity of clay-like mass was extruded to form a four foot long tube with an outside diameter of 0.509 inches and an inside diameter of 0.314 inches. The extruded tube was dried overnight and then prefired at 2150°F. for two hours in dissociated ammonia. A second quantity of the clay-like mass was extruded through a 0.327 inch die into a rod form. The rod was dried overnight and prefired at 2150°F. for 2 hours. The rod or plug was isopressed at 35,000 psi and then it was inserted into an end of the tube. The assembled structure with suitable steel mandrel was similarly isopressed and then sintered for 2 hours at 2460°F. in a dissociated ammonia atmosphere.

EXAMPLE 3

A gas impermeable tungsten-rhenium closed end tube was prepared by blending 740 grams of 0.8 micron (Fisher Number) tungsten powder, 260 grams of 2 microns rhenium powder, and 30 grams of methyl cellulose in a V-blender for 1 hour. This mixture was placed in a Braeblender sigma blade mixer, a solution of 15 cc glycerin in 70 cc water was added, and the composition was mixed for 10 minutes under 25 inches of vacuum to a clay-like mass. This clay-like mass was extruded into a rod using a 0.201 inch die and a second quantity into a tube using a 0.143 inch die and 0.108 mandrel. The rod and tube were isopressed separately as herein described in Example 1, the rod was machined to a snug fit with the hole of the tube then assembled and isopressed after assembly to insure intimate contact. The assembly was then dried overnight at room temperature and subsequently presintered in wet hydrogen at 1200°C. for 2 hours. Final sintering was accomplished at 2070°–2150°C. (uncorrected optical) in a vacuum of 8.1 to $10 \times 10^{-5}$ torr. by resistive heating. Electrodes were attached to either end of the structure and 216 amperes at 21 volts was applied for 1 hours and 43 minutes to produce the sintered tube.

EXAMPLE 4

A clay-like batch as herein described in Example 3 was prepared, charged into a Loomis 120 ton extrusion press fitted with a die and mandrel capable of tubular extrusions having 29/32 inch inner diameter and 1 inch outer diameter. This extruder was fitted with a pivotal plate capable of blocking the tubular output of the extruder when suitably clamped and allowing the output to converge to a solid output, causing an end seal by filling vacancy between the pivotal plate and the end of the extruder mandrel. A hole was provided in the pivotal plate to allow any air buildup caused by the advancing extrudate to escape. After the end seal was accoplished, the pivotal plate was moved to one side so that the tubular output was allowed to resume unimpaired. A 1½ inch tube was extruded. The tube was then dried and pre-sintered as herein described in Example 3 to 1350°C. for 2 hours. The final sintering was performed in vacuum at a temperature of 2000°C. for 2 hours.

The closed end tubes of this invention can be used in a variety of applications. The closed end finned tubes produced so that they are impermeable to the passage of gases and liquids can be used as heat exchangers. The porous closed end tubes can be used as fulter tubes, for example in the manufacture of polymeric materials such as making polymeric film from thermoplastic. The metal filler tubes can be used to remove minute impurities which would cause flaws in transparent polymer film. Other uses of closed end metal tubes of this invention are reaction vessels, thermocouple sheaths, immersion heater sheaths, and a variety of other applications. An immersion heater can be prepared by forming a green tubular structure with a plugged end, inserting a nichrome heating element, packing the green tube with an electrical insulating material such as powdered magnesium oxide and sintering the packed closed end green tube. The sintering may cause some shrinkage which will be beneficial because it provides greater compaction of the insulation packing, thereby maximizing heat transfer.

Various modifications and alterations of this invention will become apparent to those skilled in the art without departing from the scope and spirit of this invention, and it should be understood that this invention is not to be unduly limited to the illustrative embodiment set forth herein.

1. A process for making a metallurgically integral closed-end tube having a straight-walled tube portion and a terminal inner plug portion, said portions consisting essentially of sintered shaped powdered metal and characterized by having homogeneous metal grain size which comprises:
   a. mixing powdered metal with a heat fugitive binder to form a clay-like mass;
   b. shaping said clay-like mass into a green structure of said tube with said closed end; and
   c. sintering said green structure in a reducing atmosphere to form said tube.

2. A process for making the tube of claim 1 which comprises:
   a. mixing powdered metal with a heat fugitive binder to form a clay-like mass;
   b. extruding a first quantity of said clay-like mass to form a tubular green structure, said tubular structure being one component;
   c. extruding a second quantity of said clay-like mass to form a solid green structure having an outer cross-sectional configuration essentially the same as the inner cross-sectional configuration of said tubular green structure, said solid structure being another component;
   d. assembling said components by inserting said solid green structure into the end of said tubular green structure to provide a tubular closed-end green structure;
   e. isopressing said tubular closed end green structure to provide intimate contact of said components, said isopressing comprising:
      i. inserting a metal mandrel into said tubular structure to prevent said tubular structure from collapsing;
      ii. sealing said tubular closed end green structure in an oil impervious pouch;
      iii. inserting said pouch into an oil filled pressurizable cylinder;
      iv. pressurizing said cylinder; and
      v. depressurizing said cylinder and removing said tubular green structure; and
   f. sintering said tubular closed-end green structure.

* * * * *